(12) United States Patent
Tomasino et al.

(10) Patent No.: US 7,264,669 B1
(45) Date of Patent: Sep. 4, 2007

(54) SCRATCH RESISTANT GRADIENT COATING AND COATED ARTICLES

(75) Inventors: Charles Tomasino, Raleigh, NC (US); Charles K. Chiklis, Cary, NC (US); Vinay G. Sakhrani, Raleigh, NC (US)

(73) Assignee: Tribofilm Research, Inc., Raleigh, NC (US)

( * ) Notice: Subject to any disclaimer, the term of this patent is extended or adjusted under 35 U.S.C. 154(b) by 185 days.

(21) Appl. No.: 11/050,230

(22) Filed: Feb. 3, 2005

(51) Int. Cl.
*C08G 77/26* (2006.01)

(52) U.S. Cl. .......................... 106/287.11; 106/287.16; 106/287.14; 528/38; 528/27; 528/34; 428/447; 427/387; 427/489; 427/503; 427/515

(58) Field of Classification Search ........ 106/287.11, 106/287.16, 287.14; 528/38, 27, 34; 428/447; 427/387, 489, 515, 503
See application file for complete search history.

(56) References Cited

U.S. PATENT DOCUMENTS

| | | | |
|---|---|---|---|
| 3,961,977 A | 6/1976 | Koda et al. | |
| 4,529,659 A * | 7/1985 | Hoshino et al. | 428/422 |
| 4,615,946 A * | 10/1986 | Temple | 428/361 |
| 4,810,576 A * | 3/1989 | Gaa et al. | 428/391 |
| 4,847,120 A | 7/1989 | Gent | |
| 5,363,994 A | 11/1994 | Angeline | |
| 5,618,860 A * | 4/1997 | Mowrer et al. | 523/421 |
| 5,679,147 A | 10/1997 | Standke et al. | |
| 5,739,369 A | 4/1998 | Matsumura et al. | |
| 5,786,032 A | 7/1998 | Hughes | |
| 5,866,262 A | 2/1999 | Galic et al. | |
| 6,057,040 A | 5/2000 | Hage | |
| 6,277,485 B1 | 8/2001 | Invie et al. | |
| 6,403,227 B1 | 6/2002 | Hage | |
| 6,500,486 B1 | 12/2002 | Anderson et al. | |
| 6,635,353 B2 | 10/2003 | Hage | |
| 6,677,047 B2 | 1/2004 | Matsumura et al. | |
| 6,770,327 B2 | 8/2004 | Edelmann et al. | |

* cited by examiner

*Primary Examiner*—Margaret G. Moore
(74) *Attorney, Agent, or Firm*—Coats & Bennett, P.L.L.C.

(57) ABSTRACT

A gradient coating is comprised of a basecoat derived from a polysiloxane prepolymer obtained from a mixture of one to three alkoxysilane monomers and at least one diepoxide monomer, and a lubricious reactant. The basecoat is applied to a substrate and dried. The lubricious reactant is then applied and allowed to permeate into the basecoat. The basecoat and lubricious reactant are then co-cured, resulting in a gradient coating composition. In addition to providing enhanced scratch and mar resistance, the gradient coating composition is solvent resistant and provides a durable hydrophobic and oleophobic surface, which makes it useful as a corrosion protectant and as a release agent.

38 Claims, No Drawings

SCRATCH RESISTANT GRADIENT COATING AND COATED ARTICLES

FIELD OF THE INVENTION

This invention relates generally to gradient coating compositions and more specifically to a prepolymer basecoat co-cured with a lubricious reactant to form a protective gradient coating and articles coated therewith.

BACKGROUND

It is well know in the art that many cross-linkable polymeric systems can be arrested at a prepolymer stage to provide a curable coating composition that can be fully cross-linked at a later stage. These are often referred to as "B-stage" polymers. There are many organic, inorganic, and organo-metallic polymers that fit this description. Examples of organic prepolymers are polyepoxides polyurethanes, and precursors to fully condensed polymers such as polyamic acids that can be converted to polyimides. Examples of organo-metallic prepolymers are polysiloxanes and titanates. Some of these B-stage prepolymers are used as tie coats for improving adhesion of additional layers of coatings. Other prepolymers are often internally formulated so as to arrive at the final cured coating properties without any attempt to modify the cured properties by topically applying other reactants to form a gradient structure.

It is often desirable to apply a protective coating to items made of plastic, glass, metal, and other materials. These protective coatings impart certain desirable characteristics to the material including, but not limited to, scratch resistance, mar resistance, wear resistance, static resistance, and corrosion resistance. The coatings can also be used as a release agent. It is also desirable that the coated material maintain adequate resistance to common chemicals, thermal and mechanical cycling and shock, and humidity. The ease of formulating and applying the coating are also important characteristics.

Many articles traditionally made of glass are increasingly being manufactured from various plastic materials due to their light weight, low cost, and ease of manufacture. Specifically, polycarbonate and CR-39 (diethyleneglycol bis allylcarbonate) are often chosen as glass substitutes for optical products such as ophthalmic lenses for prescription eyewear and safety glasses, face shields, aircraft windows, picture frames, mirrors, and the like. Polyacrylate is often chosen for its optical clarity and heat resistance. The cases of electronic products, such as computers and televisions, are often made of polystyrene, as are other clear, rigid containers that need to be economical. Disposable syringes and other medical devices can be made of polypropylene. Polyester and polyacetate are used for photographic film substrates, and polyester is also used for liquid crystal displays. Polyacetal is used for applications requiring dimensional stability. It is desirable that all of these materials exhibit scratch, mar, and wear resistance to maintain optical clarity and a mar-free appearance.

Protective eyewear based on polycarbonate (e.g., eyeglasses, goggles, face shields) is ubiquitous. It is found in laboratories, chemical plants, machine and woodworking shops, sports equipment, and dental offices to name a few. Polycarbonate is one of the world's foremost engineering materials and its usage in protective eyewear is based on its optical clarity, impact resistance, toughness, light weight, high refractive index, and excellent weatherability due to added ultraviolet (UV) light stabilizers. However, its surface is comparatively soft and is prone to wear and scratching even with a tissue. Despite widespread required use in the workplace, there has been a significant reluctance among many workers to wear safety eyewear. Usual complaints include the inability to see clearly and comfortably because the eyewear is scratched. Because most companies provide protective eyewear to their employees, replacement eyewear costs can be substantial.

In order to attenuate the scratching propensity of plastics, primarily those plastics used in ophthalmic lenses and safety eyewear, the chemical industry has developed a number of hard, abrasion resistant coatings that are generically called "hardcoats." These coatings do improve the scratch resistance of polycarbonate to some extent. However, the level of protection does not approach the scratch resistance of glass. There is still a need to increase the scratch resistance of these plastic products, as well as products made of other substrates, to extend their useful life.

SUMMARY

The present invention comprises a gradient coating that provides enhanced scratch resistance to a substrate. The gradient coating composition includes a first alkoxysilane monomer and a lubricious reactant. The first alkoxysilane monomer has at least two siloxane linkage-forming group and at least one non-siloxane-linkage-forming group having at least one reactive side group, the siloxane linkage-forming group and the non-siloxane-linkage-forming group being attached to a silicon atom. Additionally, the gradient coating composition includes at least one selected form the group consisting of a second alkoxysilane monomer, a third alkoxysilane monomer, and a non-silane-based epoxy resin. The second alkoxysilane monomer is comprised of at least one siloxane linkage-forming group and at least one non-siloxane-linkage-forming reactive group attached to a silicon atom, wherein the reactive non-siloxane-linkage-forming reactive group is capable of reacting with the reactive side group of the first alkoxysilane monomer. The third alkoxysilane monomer has at least three siloxane linkage-forming groups attached to a silicon atom. The non-silane-based epoxy resin is capable of reacting with the reactive side group of the first alkoxysilane monomer, the non-siloxane-linkage-forming reactive group of the second alkoxysilane monomer, or combinations thereof.

In one embodiment of the present invention, the lubricious reactant is a functionalized perfluoropolyether compound represented by the general formula,

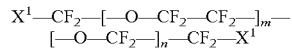

wherein $X^1$ is a carboxylic acid group, a hydroxyl group, or an ester, and m and n vary such that the molecular weight has a value in the range between about 200 and about 10,000. In another embodiment, the lubricious reactant is a silicone compound represented by the general formula,

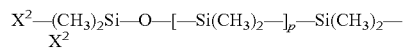

wherein $X^2$ is a carboxylic acid group, a hydroxyl group, or an ester, and p varies such that the molecular weight has a value in the range between about 500 and about 200,000.

In yet another embodiment of the present invention, the gradient coating composition comprises an alkoxysilane monomer and a lubricious reactant, without a second alkoxysilane monomer, a third alkoxysilane monomer, and a non-silane-based epoxy resin. In addition to providing enhanced scratch resistance, this gradient coating composition is solvent resistant and provides a durable hydrophobic and oleophobic surface, which makes it useful as a corrosion protectant and as a release agent.

The present invention also comprises a method for coating the surface of an article with a gradient coating composition. A basecoat comprising a first alkoxysilane monomer and at least one selected from the group consisting of a second alkoxysilane monomer, a third alkoxysilane monomer, and a non-silane-based epoxy resin is applied to the surface of an article and allowed to dry. A lubricious reactant is then applied to the dried basecoat and allowed to permeate the basecoat. The coated article is then exposed to an energy source to co-cure the basecoat and lubricious reactant, resulting in a gradient coating composition. The energy source may be any suitable energy source, such as thermal, microwave, ionizing radiation, or ionizing gas plasma.

In yet another embodiment, the present invention comprises a method for coating the surface of an article with a gradient coating composition wherein a basecoat is comprised of an alkoxysilane monomer without a second alkoxysilane monomer, a third alkoxysilane monomer, and a non-silane-based epoxy resin. The alkoxysilane monomer is applied to the surface of the article and allowed to dry. A lubricious reactant is then applied to the dried basecoat and allowed to permeate the basecoat. The coated article is then exposed to an energy source to co-cure the basecoat and lubricious reactant, resulting in a gradient coating composition. The energy source may be any suitable energy source, such as thermal, microwave, ionizing radiation, or ionizing gas plasma.

The present invention also comprises articles having at least one surface coated with any of the gradient coating compositions described above. These articles may be any suitable material, including plastic (e.g., polycarbonate, CR-39, polyacrylate, polystyrene, polypropylene, polyester, polyacetate, and polyacetal), metal, ceramic, porcelain, earthenware, rubber, glass, or wood.

In yet another embodiment of the present invention, a method is described to formulate stable water-based polysiloxane prepolymer compositions to avoid gelation. The method includes partially hydrolyzing an aminoalkyltrialkoxysilane, then mixing the partial hydrolozate with at least one selected from the group consisting of a tetraalkoxysilane, an alkyltrialkoxysilane, and a non-silane-based epoxy resin. The resulting polymerization reaction is then quenched prior to gelation by adding a mixture of about equal volumes of a ketone and an alcohol, typically methyl ethyl ketone and ethanol. To this mixture is added a quantity of water equal to about 50 percent to about 100 percent of the molar amount of hydrolysable groups on the tetraalkoxysilane and the alkyltrialkoxysilane, the water being diluted with about an equal volume of ethanol. This mixture is then heated to a temperature of about 40° C. to about 80° C. while monitoring the increase in viscosity. The polymerization reaction is then quenched prior to gelation by adding a quantity of an aqueous solution of acetic acid such that the amount of acetic acid added is equal to about the molar amount of amine in the mixture.

These and other features, aspects, and advantages of the present invention will become better understood with reference to the following description and appended claims.

DESCRIPTION

It is understood that the embodiments described herein are intended to serve as illustrative examples of certain embodiments of the present invention. Other arrangements, variations, and modifications of the described embodiments of the invention may be made by those skilled in the art. No unnecessary limitations are to be understood from this disclosure, and any such arrangements, variations, and modifications may be made without departing from the spirit of the invention and scope of the appended claims. Stated ranges include the end points of the range and all intermediate points within the end points.

Definitions

In the description that follows, a number of terms are used. In order to provide a clear and consistent understanding of the specification and appended claims, including the scope to be given such terms, the following definitions are provided:

B-stage. An intermediate stage in the curing reaction of certain thermosetting resins. In the present invention, it is characterized as arresting the polymerization reaction prior to complete cross-linking of the monomers. Full cross-linking can be initiated at the appropriate point in the process.

Gradient Coating. A gradient coating is formed by first applying a basecoat of a B-staged prepolymer material and allowing the basecoat to dry. A second material (lubricious reactant) is then applied. The lubricious reactant permeates the basecoat layer. The basecoat and the lubricious reactant are co-cured, resulting in a gradient coating composition. The term "gradient coating" is used to distinguish the present invention from multilayer scratch resistant coatings.

Lubricious Reactant. In a gradient coating, it is the material that is applied to the dried basecoat and that permeates the basecoat layer. Once applied to the basecoat and co-cured, the lubricious reactant is not a topcoat, nor is it a separate layer distinct from the basecoat. In the present invention, the lubricious reactant is a functionalized perfluoropolyether compound of the formula,

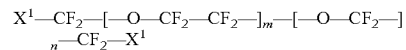

or a silicone compound represented by the general formula,

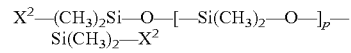

wherein the functional groups $X^1$ and $X^2$ are carboxylic acid groups, hydroxyl groups, or esters. For the functionalized perfluoropolyether compound, m and n vary such that the molecular weight has a value in the range between about 200 and about 10,000. For the silicone compound, p varies such that the molecular weight has a value in the range between about 500 and about 200,000.

Prepolymer. An intermediate building block of molecules eventually forming a polymer.

Siloxane Linkage-Forming Group. A chemical group that initiates condensation reactions to form the siloxane linkage Si—O—Si.

The basis of the present invention is the utilization of a cross-linkable prepolymer to form a scratch resistant gradient coating by first applying a prepolymer basecoat to the surface of a substrate and allowing it to dry, secondly applying a lubricious reactant having functional groups capable of permeating into the basecoat, and thirdly co-curing the basecoat and the lubricious reactant resulting in a gradient coating composition.

Basecoat

In one embodiment of the present invention, the composition of the gradient coating comprises a polysiloxane prepolymer basecoat cross-linked with a topically applied lubricious reactant. The basecoat comprises at least one first alkoxysilane monomer having at least two siloxane linkage-forming group and at least one non-siloxane-linkage-forming group having at least one reactive side group, the siloxane linkage-forming group and the non-siloxane-linkage-forming group being attached to a silicon atom. Additionally, the basecoat comprises one or more ingredients selected from a second alkoxysilane monomer, a third alkoxysilane monomer, and a non-silane-based epoxy resin. The second alkoxysilane monomer is comprised of at least one siloxane linkage-forming group and at least one non-siloxane-linkage-forming reactive group attached to a silicon atom, wherein the non-siloxane-linkage-forming reactive group is capable of cross-linking reaction with the reactive side group of the first alkoxysilane monomer. The third alkoxysilane monomer has at least three siloxane linkage-forming groups attached to a silicon atom. The non-silane-based epoxy resin is capable of reacting with the reactive side group of the first alkoxysilane monomer, the non-siloxane-linkage-forming reactive group of the second alkoxysilane monomer, or combinations thereof.

In another embodiment of the present invention, the gradient coating is formed on the substrate by depositing a liquid film of the basecoat onto the surface of a substrate, and then allowing solvents in the basecoat formulation to evaporate. After evaporation of the solvents, a B-staged polysiloxane prepolymer remains on the surface of the substrate. The lubricious reactant is topically applied over the B-staged polysiloxane prepolymer, permeates into the B-staged polysiloxane prepolymer, and results in a gradient coating composition upon co-curing.

Typical hardcoats are based on silane chemistry which can condense to form hard, three-dimensional networks which may be quite brittle. The present invention utilizes silane monomers having reactive side groups that provide some degree of flexibility and can cross-link with relatively flexible monomers to provide some amount of toughness to the coated structure. These silane monomers can also serve as coupling agents and have the ability to form a durable bond between the substrate and the gradient coating.

The general formula for these silane monomers shows one or more hydrolysable groups ($R^1$ in Formula 1) attached to the silicon atom. The hydrolysable groups typically have two classes of functionality, namely alkoxy or halogen. In the case where the hydrolysable group is an alkoxy, each hydrolysable group has the general chemical formula $C_nH_{2n+1}O$ where n=1 to 6. Thus, the alkyl portion of each alkoxy group is an independently selected C1 to C6 alkyl group (methyl, ethyl, propyl, butyl, pentyl, and hexyl). Examples of the halogen atoms which can function as the hydrolysable group include, but are not limited to, fluorine, chlorine, and bromine.

Hydrolysis occurs when the hydrolysable alkoxy group is reacted with water, forming silanol groups as shown in Formula 1.

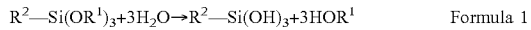
$$R^2\text{—}Si(OR^1)_3 + 3H_2O \rightarrow R^2\text{—}Si(OH)_3 + 3HOR^1 \qquad \text{Formula 1}$$

Two silanol groups from neighboring molecules can condense to form a siloxane linkage by the elimination of a mole of water (see Formula 2). Since there are multiple silanol forming groups on a single monomer, a polysiloxane prepolymer will be formed which ultimately becomes a three-dimensional cross-linked gradient coating when cured.

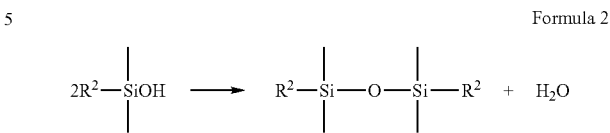

Formula 2

The $R^2$ group attached to the silicon atom is a non-hydrolysable organic radical that may posses a functionality that imparts certain desired characteristics. In one embodiment of the present invention, the $R^2$ group of the first alkoxysilane monomer contains a side group capable of reacting with a side group of the third alkoxysilane monomer and is represented by the general formula $—C_nH_{2n}X^3$, wherein $—C_nH_{2n}—$ represents an independently selected C1 to C6 alkyl group and n=1 to 6. Examples of side groups represented by $X^3$ include, but are not limited to, primary amines, secondary amines, epoxides, glycidyl ethers, acryloxy and methacryloxy groups, and halogen. When $X^3$ is a secondary amine, the functional group of each amine is an independently selected C1 to C6 alkyl group or an aryl group. There are numerable alkoxysilane monomers that meet this description and are suitable for the present invention. For example, compounds that are suitable as the first alkoxysilane monomer are as follows: 2-aminoethyltrimethoxysilane, 2-aminoethyltriethoxysilane, 2-aminoethyltributoxysilane, 2-aminoethyltripropoxysilane, aminoethyltrimethoxysilane, aminoethyltriethoxysilane, aminomethyltriethoxysilane, 3-aminopropyltrimethoxysilane, 3-aminopropyltriethoxysilane, 3-aminopropyltributoxysilane, 3-aminopropyltripropoxysilane, 2-aminopropyltrimethoxysilane, 2-aminopropyltriethoxysilane, 2-aminopropyltripropoxysilane, 2-aminopropyltributoxysilane, 1-aminopropyltrimethoxysilane, 1-aminopropyltriethoxysilane, 1-aminopropyltributoxysilane, 1-aminopropyltripropoxysilane, N-aminomethylaminoethyltrimethoxysilane, N-aminomethylaminomethyltripropoxysilane, N-aminomethyl-2-aminoethyltrimethoxysilane, N-aminomethyl-2-aminoethyltriethoxysilane, N-aminomethyl-2-aminoethyltripropoxysilane, N-aminomethyl-3-aminopropyltrimethoxysilane, N-aminomethyl-3-aminopropyltriethoxysilane, N-aminomethyl-3-aminopropyltripropoxysilane, N-aminomethyl-2-aminopropyltriethoxysilane, N-aminomethyl-2-aminopropyltripropoxysilane, N-aminopropyltripropoxysilane, N-aminopropyltrimethoxysilane, N-(2-aminoethyl)-2-aminoethyltrimethoxysilane, N-(2-aminoethyl)-2-aminoethyltriethoxysilane, N-(2-aminoethyl)-2-aminoethyltripropoxysilane, N-(2-aminoethyl)-aminoethyltriethoxysilane, N-(2-aminoethyl)-aminoethyltripropoxysilane, N-(2-aminoethyl)-2-aminopropyltrimethoxysilane, N-(2-aminoethyl)-3-aminopropyltriethoxysilane, N-(2-aminoethyl)-3-aminopropyltripropoxysilane, N-(2-aminoethyl)-3-aminopropyltrimethoxysilane, N-(2-aminoethyl)-2-aminopropyltriethoxysilane, N-(2-aminoethyl)-2-aminopropyltripropoxysilane, N-(2-aminopropyl)-2-aminoethyltrimethoxysilane, N-(3-aminopropyl)-2-aminoethyltriethoxysilane, N-(3-aminopropyl)-2-aminoethyltripropoxysilane, N-methylaminopropyltriethoxysilane, N-methylaminopropyltrimethoxysilane, 2-aminopropylmethyldiethoxysilane, 3-diethylenetriaminopropyltriethoxysilane, vinyltrimethoxysilane, 3-methacryloxypropyl trimethoxysilane, 3-acryloxypropyltrimethoxysilane, 3-mercaptopropyltrimethoxysilane, N-2-aminoethyl-3-propyltrimethoxysilane, vinylmethyldimethoxysilane, 3-methacryloxyproylmethyldimethoxysilane, vinyltriethoxysilane, 3-methacryloxyproyltriethoxysilane, 3-acryloxyproyltriethoxysilane, 3-mercaptopropyltriethoxysilane, N-2-aminoethyl-3-propyltriethoxysilane, vinylmethyldiethoxysilane, and 3-methacryloxyproylmethyldiethoxysilane.

In yet another embodiment of the present invention, an epoxyfunctional second alkoxysilane monomer may also be incorporated into the prepolymer to modify the crosslink density of the cured coating. This monomer is similar in basic chemical structure to that of the first monomer, except that an epoxy moiety is incorporated within the non-hydrolysable group. The epoxy group may be a simple or substituted oxirane, a glycidyl group, a glycidyloxy group, a cyclohexaneoxide (epoxycyclohexyl) or cyclopentaneoxide (epoxycyclopentyl) polymerizable group. Examples of epoxy functional alkoxysilane monomers suitable for the present invention are as follows: 3-glycidoxymethyltrimethoxysilane, 3-glycidoxymethyltriethoxysilane, 3-glycidoxymethyltripropoxysilane, 3-glycidoxymethyltributoxysilane, 2-glycidoxyethyltrimethoxysilane, 2-glycidoxyethyltriethoxysilane, 2-glycidoxyethyltripropoxysilane, 2-glycidoxyethyltributoxysilane, glycidoxyethyltriethoxysilane, glycidoxyethyl-tripropoxysilane, glycidoxyethyltributoxysilane, 3-glycidoxypropyltrimethoxysilane, 3-glycidoxypropyltriethoxysilane, 3-glycidoxypropyltripropoxysilane, 3-glycidoxypropyltributoxysilane, 2-glycidoxypropyltrimethoxysilane, 2-glycidoxyypropyltriethoxysilane, 2-glycidoxypropyltripropoxysilane, 2-glycidoxypropyltributoxysilane, 1-glycidoxypropyltriethoxysilane, 1-glycidoxypropyltrimethoxysilane, 1-glycidoxypropyltripropoxysilane, 1-glycidoxypropyltributoxysilane, 3-glycidoxybutyltrimethoxysilane, 4-glycidoxybutyltriethoxysilane, 4-glycidoxybutyltripropoxysilane, 4-glycidoxybutyltributoxysilane, 4-glycidoxybutyltrimethoxysilane, 3-glycidoxybutyltriethoxysilane, 3-glycidoxybutyltripropoxysilane, 3-propoxybutyltributoxysilane, 1-glycidoxybutyltrimethoxysilane, 1-glycidoxybutyltriethoxysilane, 1-glycidoxybutyltripropoxysilane, 1-glycidoxybutyltributoxysilane, 2-epoxypropyltrimethoxysilane, 2-epoxypropyltriethoxysilane, (3,4-epoxycyclohexyl)-methyltrimethoxysilane, (3,4-epoxycyclohexyl)-methyltriethoxysilane, (3,4-epoxycyclohexyl)-methyltripropoxysilane, (3,4-epoxycyclohexyl)-methyltributoxysilane, (3,4-epoxycyclohexyl)-ethyltrimethoxysilane, (3,4-epoxycyclohexyl)-ethyltriethoxysilane, (3,4-epoxycyclohexyl)-ethyltripropoxysilane, (3,4-epoxycyclohexyl)-ethyltributoxysilane, (3,4-epoxycyclohexyl)-propyltrimethoxysilane, (3,4-epoxycyclohexyl)-propyltriethoxysilane, (3,4-epoxycyclohexyl)-propyltripropoxysilane, (3,4-epoxycyclohexyl)-propyltributoxysilane, (3,4-epoxycyclohexyl)-butyltrimethoxysilane, (3,4-epoxycyclohexyl)-butyltriethoxysilane, (3,4-epoxycyclohexyl)-butyltripropoxysilane, (3,4-epoxycyclohexyl)-butyltributoxysilane, and 3-glycidoxyproyltriethoxysilane.

In other embodiments of the present invention, the third alkoxysilane monomer can be an alkyltriethoxysilane without reactive side groups, a tetra-alkoxysilane, or a combination of these silanes. The third alkoxysilane monomer contains siloxane linkage-forming groups that are alkoxy groups wherein the alkyl portion of the alkoxy group is an independently selected C1 to C6 alkyl group. These monomers are used to modify the polysiloxane network and control the degree of three-dimensional cross-linking of the cured gradient coating. Examples of compounds that are suitable as the third alkoxysilane monomer include tetramethoxysilane, tetrapropoxysilane, tetra-n-propoxysilane, tetra-1-propoxysilane, tetra-n-butopoxysilane, tetra-sec-butopoxysilane, tetra-tert-butopoxysilane, tetraethoxysilane, methyltrimethoxysilane, ethyltrimethoxysilane, butyltrimethoxysilane, octyltrimethoxysilane, dodecyltrimethoxysilane, phenyltrimethoxysilane, dimethyldimethoxysilane, diethyldimethoxysilarie, dibutyldimethoxysilane, diphenyldimethoxysilane, trimethylmethoxysilane, triethylmethoxysilane, triphenylmethoxysilane, ethylsilicate, methyltriethoxysilane, ethyltriethoxysilane, butyltriethoxysilane, octyltriethoxysilane, dodecyltriethoxysilane, phenyltriethoxysilane, dimethyldiethoxysilane, diethyldiethoxysilane, dibutyldiethoxysilane, diphenyldiethoxysilane, trimethylethoxysilane, triethylethoxysilane, propyltrimethoxysilane, and propyltriethoxysilane.

Another embodiment of the present invention comprises a non-silane-based epoxy resin which can be added to the basecoat formulation to further modify the three-dimensional network of the cured coating by reacting with the non-hydrolysable reactive side groups of the silane monomers thereby creating less brittle gradient. Suitable non-silane-based epoxy resins include aliphatic and cycloaliphatic diepoxides such as those derived from aliphatic glycols and cycloaliphatic diols. Also, any compounds containing two or more epoxy, glycidyl, epoxycyclohexyl, or epoxycyclopentyl groups would be useful. Examples of non-silane-based epoxy resins suitable for the present invention include 1,4-cyclohexanedimethanol diglycidylether, 1,2-cyclohexanedimethanol diglycidylether, 1,4-butanediol diglycidylether, trimethylolpropane triglycidylether, and diethyleneglycol diglycidylether. For those applications which can tolerate a low level of yellowing in the fully cured gradient coating, epoxy resins based on diglycidyl ethers of bis-phenol A and bis-phenol F and multifunctional glycidyl epoxidized novolac resins can be used. These novolac resins are useful for applications which require enhanced thermal stability in addition to scratch and mar resistance.

In addition, the non-siloxane-linkage-forming group of the second alkoxysilane monomer and that of the first alkoxysilane monomer provide affinity for the topically applied lubricious reactant to permeate into the basecoat and also provide additional reactive sites with which the lubricious reactant and basecoat can co-cure, thus forming a gradient coating with superior abrasion resistance.

The following nonlimiting discussion is an attempt to explain the chemical reactions that may occur to make a basecoat suitable for coating substrates according to one embodiment of the present invention. Coating solutions may be applied by dip coating, spray coating, roll coating, wire coating, or any other means know in the art of evenly spreading the prepolymer solution over the surface of a substrate. Solids content, viscosity, and evaporation rates become important in determining the thickness and clarity of the cured coating.

It is desirable to control the extent of each reaction that takes place in the formation of the basecoat. The first reaction is the hydrolysis of the alkoxy silanes to their corresponding silanols. This reaction is controlled by limiting the ratio of water to alkoxy groups. Various alkoxy silanes have different rates of hydrolysis, and these rates are typically taken into account when forming the corresponding silanol. The rate is influenced by the nature of the alkoxy group and the size of the alkoxy group. Methoxy groups hydrolyze faster than ethoxy groups which are faster than propoxy groups and so forth. Also, acids and bases act as catalysts and influence the rate of hydrolysis. The amine-bearing silanes described above are self-catalyzing.

The second reaction is the condensation of the silanol groups to form polysiloxane linkages. Like the first reaction, the second reaction is controlled by limiting the rate of hydrolysis. Other controlling factors are the amount of dilution with solvents, reaction time, and reaction temperature. If the second reaction is carried too far, then gelation will occur rendering the composition unsuitable for coating surfaces.

The third reaction is the reaction of the epoxy functionalities on the third alkoxysilane monomer and the non-silane-based epoxy resin with the amine functionality of the first alkoxysilane monomer. This reaction is controlled by the amount of dilution with solvents, reaction time, and reaction temperature. Here too if the reaction is carried too far, gelation will occur.

In one embodiment of the present invention, the alkoxysilane (3-aminopropyltriethoxysilane, or APTEOS) is hydrolyzed at room temperature with about 40 to about 80 percent of the water required to hydrolyze all of the ethoxy groups. The reaction is exothermic, and within seconds the solution becomes hazy, then cloudy, then opaque and gelatinous. With continued stirring, the mixture becomes a clear fluid. The hydrolyzed alkoxysilane (hydrolyzate) is allowed to age for about 24 hours under ambient conditions prior to use. Our rheological measurements indicate that the solution equilibrates in a few hours and remains stable and fit for use for at least four weeks. During aging, the silanols condense to form oligomers. For representation purposes, the oligomers will be referred to as "hydrolyzed APTEOS." Tetraethoxysilane or methyltrimethoxysilane and optionally 3-glycidoxypropyltriethoxysilane are added next along with the diepoxide. A quantity of water diluted with an equal volume of a suitable solvent (usually ethanol) is then added, and the mixture is allowed to react for about 15 minutes to about 1 hour. The quantity of water is equivalent to about 50 to about 100 mole percent of the hydrolysable groups on the added silanes. The added alkoxysilanes are converted to their corresponding silanols and become incorporated into the polysiloxane prepolymer structure. Concurrently, the epoxy groups begin to react with amine groups. The reactions are exothermic and are quenched prior to gelation by adding a quantity of a suitable solvent, typically a 50/50 mixture by volume of methyl ethyl ketone and ethanol. The resulting basecoat solution is aged at about 10° C. for about 24 hours prior to use. This solution has a limited pot life and should be stored in a freezer when not in use.

During the course of our research on the basecoat, we discovered conditions which allowed us to control the prepolymer formation without incurring gelation. We found that by mixing the ingredients together as described above, including the quenching mixture of methyl ethyl ketone and ethanol, and heating the mixture to a temperature of about 40° C. to about 80° C., the growth of the prepolymer could be accelerated as evidenced by an increase in viscosity. At the appropriate time just prior to gelation and with vigorous stirring, the reaction can be quenched by adding a mixture of water and acetic acid, the amount of acetic acid being equivalent to the molar amount of amine in the mixture. After adding the aqueous acetic acid, the viscosity of the mixture drops and reaches a steady state. Most importantly, the basecoat solution is very stable at room temperature as evidenced by consistent viscosity measurements over a period of at least five weeks. Thus, the pot life of the mixture was extended indefinitely without the need for refrigeration of the mixture.

Lubricious Reactant

The lubricious reactant is capable of permeating into the B-staged basecoat after the basecoat is applied to the substrate and dried sufficiently to evaporate solvents contained in the basecoat but without distorting the substrate. Upon the application of sufficient energy, the lubricious reactant is capable of reacting with side groups contained within the basecoat to form a gradient coating.

The basis for the materials capable of performing the function of the lubricious reactant is the presence of a nonpolar chain capped with a small number of reactive groups. The size and shape of the lubricious reactant molecule is such that it permeates into the prepolymer basecoat and that the reactive groups have an affinity for and can react with the reactive sites along the prepolymer structure. Examples of such reactants include, but are not limited to, carboxylated, sulfonated, phosphated, and esterificated hydrocarbons, silicones, and perfluorochemicals. Other functional groups could be equally effective depending on the reactive sites on the prepolymer. For example, B-staged prepolymer having anionic side groups would attract and react with lubricious reactants having cationic groups.

In one embodiment of the present invention, the basic composition of the lubricious reactant is a perfluoropolyether (PFPE) with carboxyl end groups. Perfluoropolyether materials have been used successfully as high performance lubricants in semiconductor and aerospace applications for decades due to their inert nature and wide range of thermal stability. We have found that these general PFPE lubricants do not result in any significant anchoring or bonding to existing hardcoat products due to the inert nature of PFPE compounds even if they were put through a "cure" cycle. Washing with isopropanol removes the PFPE layer. The present invention uses PFPE materials that have reactive functional groups that can interact with the functional groups of the basecoat. Reactive PFPE compounds manufactured by Solvay Solexis, Inc. (Thorofare, N.J.) are available under the trade name Fomblin® and have the general formula shown in Formula 3.

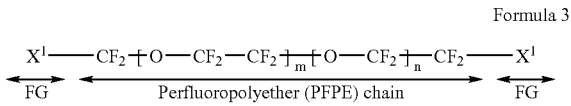

Formula 3

$X^1$ represents a reactive functional group present at the ends of the PFPE molecule, and m and n vary such that the molecular weight has a value in the range between about 200 and about 10,000. Two compounds, Fomblin Z-DOL® with hydroxyl (—OH) functionality and Fomblin Z-DIAC® (also designated Fluorolink C®) with carboxylic acid (—COOH) functionality fit the general description of lubricious reactants.

In yet another embodiment of the present invention, the lubricious reactant is a silicone compound represented by Formula 4. As with the PFPE-based lubricious reactant, $X^2$ represents a functional group as previously described, and p varies such that the molecular weight has a value in the range between about 500 and about 200,000.

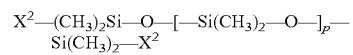

Formula 4

In one embodiment of the present invention, Fomblin Z-DIAC® (see Formula 5) was chosen because of its affinity for and reaction with the amine groups of the prepolymer basecoat. The reaction product between the carboxylic acid functional groups on the Fomblin Z-DIAC® molecule and the amine reactive sites of the basecoat is shown in Formula 6.

The embodiments of the present invention may also include other ingredients conventionally found in coating formulations. For example, surfactants may be added to improve wettability and ensure a uniform coating thickness across the surface of the substrate. Various pigments and dyes may be added to tint the coating. Fillers may also be added, as well as antioxidants, dispersants, waxes, anticor-

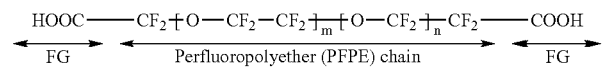

Formula 5

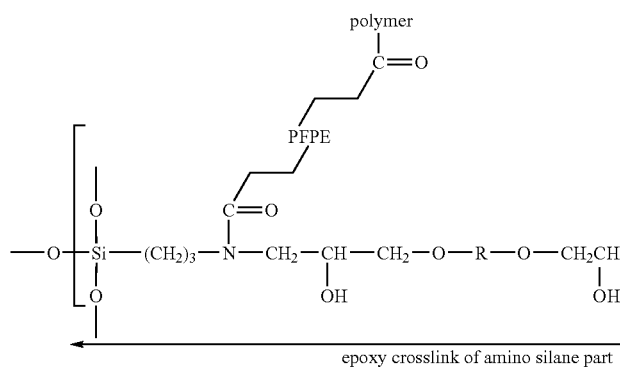

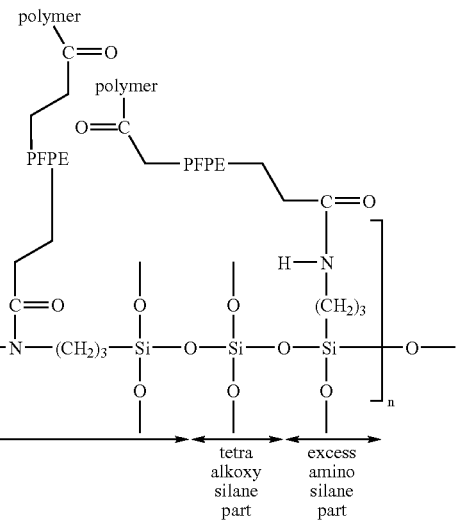

Formula 6

The structure of Formula 6 is a representation of the co-curing reaction that takes place between the lubricious reactant and the reactive amine groups along the prepolymer structure. The coating formed upon curing is cross-linked three-dimensionally. In one embodiment of the present invention, there is an excess of hydrolyzed APTEOS in relation to the diepoxide so that both primary and secondary amines are present in the prepolymer structure. Fomblin Z-DIAC® has two carboxyl groups per molecule capable of reacting with both the primary and secondary amines, setting up an additional cross-linking mechanism. The final cure stage then proceeds by cross-linking via polysiloxane formation, cross-linking via the epoxy-amine reactions, and cross-linking via reaction of the carboxyl sites of the lubricious reactant and the amines. The density of the reaction of the carboxyl sites of the lubricious reactant and the amines throughout the basecoat is controlled by the permeation of the lubricious reactant into the basecoat. Since the lubricious reactant is topically applied, a gradient coating is obtained wherein the outer surface has a higher population of these cross-links compared to the substrate-coating interface. It is advantageous to confine these reactions to near the surface so as to not interfere with the adhesion of the coating to the substrate.

The co-curing of the gradient coating occurs by exposing the gradient coating to an energy source. Any appropriate energy source known in the art may be used, including, but not limited to, thermal, microwave, ionizing radiation, and ionizing gas plasma. The energy source used is not critical to the present invention.

rosive agents, and antifoaming agents. The use of such other ingredients will be obvious to one skilled in the art, and the use of such other ingredients does not depart from the present invention, nor depart from the true spirit and scope of the present invention.

Any desired substrate may be treated with the gradient coating of the present invention. The substrate may be a plastic material such as polycarbonate, CR-39, polyacrylate, polystyrene, polypropylene, polyester, polyacetate, polyacetal, polyethylene, polyvinyl chloride, polymethyl methacrylate, diethyleneglycol bis allylcarbonate, and nylons. Non-plastic materials such as metals, ceramics, porcelains, earthenware, rubber, glass, and wood may also be treated. Articles for which the present invention may prove useful include, but are not limited to, ophthalmic products (such as eyeglass lenses, safety glasses, and faceshields), windows, windshields, aircraft canopies, optical lenses, compact discs, video discs, semiconductors, liquid crystal display faceplates, watch faceplates, dashboard assemblies, computer screens, television screens, vehicular headlight and taillight assemblies and covers, vials, bottles, containers, trays and bins used in appliances, and jewelry.

Any method of coating application known in the art may be used with the present invention. Example application methods include, but are not limited to, dip, spray, roll, brush, wipe, spin, and curtain. The method of application is not critical to the present invention.

EXAMPLES

The abrasion testing in the following examples was performed according to the Bayer Abrasion Test as per American Society for Testing and Materials (ASTM) Method F735-94. This method uses a small pan with the test samples mounted at the bottom of the pan. An abrasive media, Alundum ZF® supplied by Norton Abrasives of Canada, is poured on top of the samples such that there is a head of abrasive particles of at least 0.5 inches above the substrate. The pan is then shaken back and forth a distance of 4 inches, at 150 cycles per minute for 4 minutes (total of 600 cycles). This reciprocating motion causes the abrasion or scratching of the substrate surface. The samples are then washed with deionized water and mounted in a hazemeter for measurement of haze as per ASTM Method D1003. The measured percent haze is directly proportional to the abrasion resistance of the coating.

Even though the ASTM test requires 600 cycles, we evaluated all coatings for their durability up to 1,800 cycles. The higher number of cycles is important to show durability when evaluating the coatings for more stringent industrial applications besides eyewear.

All polycarbonate test specimens (measuring 2.5 inches by 1.5 inches by 0.125 inch thick) were thoroughly cleaned with isopropyl alcohol then rinsed with deionized water and air dried prior to coating. Dip coating of the specimens was conducted on a T3201 Dip Coater manufactured by Specialty Coating.

Example 1

Basecoats were formulated with various weight ratios of aminopropyltriethoxysilane (APTEOS) and diepoxide to obtain the desired physical properties of the coating. The basecoat fluids were prepared as follows:

One hundred grams (100 g) of APTEOS hydrolozate prepared from 86.95 g of APTEOS and 13.05 g of deionized water were poured into a 500 ml flat bottomed flask equipped with a 1.5 inch bar magnet and a thermometer. To the stirred fluid at room temperature was added the calculated amount of liquid diepoxide (1,4-cyclohexanedimethanol diglycidylether) sufficient to provide APTEOS/diepoxide weight ratios of 1:1, 2:1, 4:1, and 8:1. Within seconds, a clear solution resulted and upon the gentle application of heat, the reactants exothermed and the temperature rose from 21° C. to 53° C. within a few minutes. In some cases, the temperature would have risen higher had it not been for the use of an ice water bath which prevented gelation. The intensity of the exotherm increased with increasing levels of the diepoxide in the mix. When the temperature of the reactants reached the range of 50° C. to 53° C., the reaction was quenched by the rapid addition of 106 g of a mixed solvent consisting of 72 percent of methyl ethyl ketone and 28 percent by weight of ethanol. The quenched solutions were stored at 10° C. overnight prior to use.

Polycarbonate test specimens were coated with basecoat formulations with APTEOS/diepoxide ratios of 1:1, 2:1, 4:1, and 8:1 by weight. The lubricious reactant was not applied in this example. The coated test specimens were cured for one hour at 130° C. The coated test specimens were then tested for abrasion resistance, and the results are shown in Table 1. The highest abrasion resistance (i.e., the lowest percent haze readings) were obtained at ratios of 2:1 and 4:1. Even without the lubricious reactant, the basecoat performed better than either of the hardcoats of the Comparative Examples.

TABLE 1

RELATIONSHIP OF ABRASION RESISTANCE TO BASECOAT APTEOS/DIEPOXIDE RATIO

| Number of Cycles | Percent Haze APTEOS/Diepoxide Ratio (by weight) | | | |
|---|---|---|---|---|
| | 1:1 | 2:1 | 4:1 | 8:1 |
| 600 | 12.8 | 6.2 | 6.1 | 15.7 |
| 1,200 | 25.9 | 9.3 | 10.4 | 26.0 |
| 1,800 | 35.6 | 12.5 | 13.7 | 35.8 |

Example 2

Solution A. A mixture was formed by adding 15 parts water and 100 parts 3-aminopropyltriethoxysilane (APTEOS) by weight at ambient temperature. While stirring, the mixture exothermed and formed a white gelatinous material. With time, the temperature of the mixture reached 52° C. With continued stirring, the mixture became a clear homogeneous solution. The solution was allowed to cool to room temperature, then aged 24 hours at 10° C.

Solution B. A mixture was formed by adding 75 parts of methyltrimethoxysilane (MeTEOS) and 26 parts water by weight. After aging for 24 hours at room temperature, a clear homogeneous solution was obtained.

Solution C. A mixture was formed by adding 64 parts 1,4-cyclohexanedimethanol diglycidylether (diepoxide) and 15 parts isopropyl alcohol by weight.

To the desired quantity of hydrolyzed APTEOS (Solution A) was added a mixture of 2.4 parts water to 1 part isopropanol equivalent to 10 percent by weight of the hydrolyzed APTEOS. The mixture was allowed to react at room temperature for 30 minutes while stirring. Next was added the desired quantity of Solution C (the diepoxide) and stirring was continued for an additional 30 minutes. The desired quantity of hydrolyzed MeTEOS (Solution B) was then added, and the mixture was allowed to react for 5 minutes. The reaction was quenched by adding an equal volume mixture of methyl ethyl ketone and ethanol in sufficient quantity to adjust the solids content of each coating solution to 25 percent by volume. After 10 minutes at ambient temperature, each coating solution was stored at 0° C. for 24 hours.

The coating solutions were allowed to warm to ambient temperature. Polycarbonate test specimens were coated with each coating solution and allowed to dry at ambient temperature for 12 hours. One set of test specimens was coated with a solution containing 0.5 percent by weight of Fomblin Z-DIAC® in Fomblin Perfluorosolv PFS-1™ solvent (available from Solvay Solexis, Inc., Thorofare, N.J.), and then the solvent was allowed to evaporate. A second set of test specimens was not coated with the Fomblin Z-DIAC® fluid. All of the test specimens were then cured for 1 hour at 130° C. and tested for abrasion resistance.

The abrasion test results are presented in Table 2. These data show a marked improvement in abrasion resistance after 600 cycles when the lubricious reactant is co-cured with the B-staged basecoat as compared to curing without the lubricious reactant.

TABLE 2

EFFECT OF CO-CURING LUBRICIOUS REACTANT WITH VARIOUS BASECOAT FORMULATIONS

| | Molar Ratio | | | Percent Haze | |
|---|---|---|---|---|---|
| | A | B | C | With Lubricious Reactant | Without Lubricious Reactant |
| Fluid 1 | 4 | 0.44 | 1 | 6.6 | 13.4 |
| Fluid 2 | 4 | 2.2 | 1 | 4.5 | 10.1 |
| Fluid 3 | 4 | 6.0 | 1 | 7.3 | 11.0 |

A = APTEOS
B = MeTEOS
C = Diepoxide

Example 3

Solution A. Solution A was prepared as described in Example 2.

Solution B. Tetraethoxysilane (100%)

Solution C. An equal volume mixture of cyclohexanedimethanol diglycidylether (diepoxide) and ethanol.

To the desired quantity of hydrozyled APTEOS (Solution A) was added the desired quantity of Solution B, and a quantity of an equal volume mixture of methyl ethyl ketone and ethanol equivalent by volume to the amount of hydrolyzed APTEOS while stirring. The desired quantity of Solution C was then added, followed by the addition of an equal volume mixture of water and ethanol equivalent to 2.5 percent by volume of the hydrolyzed APTEOS. The resulting solution exothermed and was stirred for 30 minutes. External heat was added sufficient to raise the temperature to between 42° C. and 72° C., at which point the viscosity began to rise. At a point before the viscosity reached gelation, the reaction was quenched with an aqueous acetic acid solution, the amount of acetic acid being equivalent to the molar amine content of the APTEOS. The quantity of water corresponded to the balance needed to dilute the mixture to 25 percent solids by volume. The temperature and viscosity of the coating solution dropped immediately after adding the aqueous acetic acid, and the solution became fluid. Heating and stirring was continued until the temperature reached 76° C. The coating solution was cooled to ambient temperature, filtered, and stored at ambient temperature.

Polycarbonate test specimens were coated with each coating solution and allowed to dry at ambient temperature for at least 20 minutes. One set of test specimens was coated with a solution containing 0.5 percent by weight of Fomblin Z-DIAC® in Fomblin Perfluorosolv PFS-1™ solvent, and then the solvent was allowed to evaporate. A second set of test specimens was not coated with the Fomblin Z-DIAC® coating. All of the test specimens were then cured for 1 hour at 130° C. and tested for abrasion resistance.

The abrasion test results are presented in Table 3. These data again demonstrate the marked improvement in abrasion resistance at 600 cycles when the B-stage basecoat is co-cured with the lubricious reactant compared to curing without the lubricious reactant.

TABLE 3

EFFECT OF CO-CURING LUBRICIOUS REACTANT WITH VARIOUS BASECOAT FORMULATIONS

| | Molar Ratio | | | Percent Haze | |
|---|---|---|---|---|---|
| | A | B | C | With Lubricious Reactant | Without Lubricious Reactant |
| Fluid 1 | 4 | 0 | 1 | 6.5 | 11.6 |
| Fluid 2 | 4 | 1 | 1 | 4.4 | 11.9 |
| Fluid 3 | 4 | 2 | 1 | 3.3 | 16.1 |
| Fluid 4 | 4 | 4 | 1 | 4.0 | 16.0 |

A = APTEOS
B = TEOS
C = Diepoxide

Example 4

Coating Fluid 1. A mixture was formed by adding 16.5 parts by weight of 3-glycidoxypropyltriethoxysilane and 3.4 parts of deionized water, and hydrolyzed by adding 0.07 parts of 10 percent hydrochloric acid to form a clear solution. Next, 25 parts of hydrolyzed APTEOS (prepared as described for Solution A in Example 2) and 106 parts of an equal volume mixture of methyl ethyl ketone and ethanol were added. The resulting mixture was aged for 12 hours at 0° C.

Coating Fluid 2. A mixture was formed by adding 16.4 parts by weight of 3-glycidoxypropyltriethoxysilane and 3.4 parts of deionized water, and hydrolyzed by adding 0.07 parts of 10 percent hydrochloric acid to form a clear solution. Next, 1.6 parts of cyclohexanedimethanol diglycidylether (diepoxide) was added, followed by the addition of 14 parts of hydrolyzed APTEOS and 50 parts of an equal volume mixture of methyl ethyl ketone and ethanol. The resulting mixture was aged for 12 hours at 0° C.

Polycarbonate test specimens were coated with each coating solution and allowed to dry at ambient temperature for 30 minutes. One set of test specimens was coated with a solution containing 0.5 percent by weight of Fomblin Z-DIAC® in Fomblin Perfluorosolv PFS-1™ solvent, and then the solvent was allowed to evaporate. A second set of test specimens was not coated with the Fomblin Z-DIAC® coating. All of the test specimens were then cured for 1 hour at 130° C. and tested for abrasion resistance.

The abrasion test results are presented in Table 4. These data again demonstrate the marked improvement in abrasion resistance at 600 cycles when the B-stage basecoat is co-cured with the lubricious reactant compared to curing without the lubricious reactant.

TABLE 4

EFFECT OF CO-CURING LUBRICIOUS REACTANT WITH VARIOUS BASECOAT FORMULATIONS

| | Molar Ratio | | | Percent Haze | |
|---|---|---|---|---|---|
| | A | B | C | With Lubricious Reactant | Without Lubricious Reactant |
| Fluid 1 | 1 | 0.7 | 0 | 3.6 | 8.2 |
| Fluid 2 | 1 | 1.3 | 0.12 | 4.0 | 9.7 |

A = APTEOS
B = Epoxysilane
C = Diepoxide

Example 5

To determine the amount of time necessary to fully cure the basecoat, polycarbonate test specimens were coated with a basecoat solution containing a 4:1 ratio by weight of APTEOS/diepoxide. Since polycarbonate is stable up to approximately 140° C., a temperature of 120° C., slightly below the softening point of polycarbonate, was chosen for the curing temperature. Coated test specimens were cured for 1 hour and 4 hours, then tested for abrasion resistance. The test results are presented in Table 5. No appreciable change in abrasion resistance was seen between the samples cured at 1 hour and those cured at 4 hours. Therefore, a curing time of 1 hour was considered sufficient to cure the basecoat.

TABLE 5

EFFECT OF CURING TIME OF THE BASECOAT ON ABRASION RESISTANCE

| | Percent Haze | |
|---|---|---|
| Number of Cycles | 1 Hour, 120° C. | 4 Hours, 120° C. |
| 600 | 8.1 | 6.5 |
| 1,200 | 9.6 | 10.4 |
| 1,800 | 13.0 | 14.0 |

Example 6

The basecoat was formulated using a 4:1 APTEOS/diepoxide ratio (by weight). TEOS was added to the basecoat formulation up to 52 percent by weight of the APTEOS/diepoxide weight. The resulting fluids were applied to polycarbonate test specimens and dried at 25° C. for at least 20 minutes. The lubricious reactant (0.25% by weight Fomblin Z-DIAC® in PFS-1™ solvent) was then applied to the test specimens, and the solvent allowed to evaporate. The test specimens were cured for 1 hour at 130° C. The abrasion testing was extended by subjecting the test specimens to additional abrasion and measuring the haze after 600, 1,200, and 1,800 cycles. Table 6A shows the results of the test specimens co-cured with the lubricious reactant, and for comparison Table 6B shows the results of the test specimens cured without the lubricious reactant.

The data clearly show that the co-cured lubricious reactant enhances the abrasion resistance of the basecoat and that the addition of TEOS into the basecoat prepolymer improves the permeation of the lubricious reactant into the prepolymer structure to form the fully cured gradient coating. The data further attest to the gradient nature of the coating, showing that the enhancement persists through multiple runs of the abrasion resistance test. If the present invention was merely a surface effect, then its effectiveness would have diminished after the first 600 abrasion cycles.

TABLE 6A

EFFECT OF TEOS CONCENTRATION WITH CO-CURED LUBRICIOUS REACTANT ON ABRASION RESISTANCE

| | Percent Haze Weight Percent TEOS | | | | |
|---|---|---|---|---|---|
| Number of Cycles | 0 | 21 | 35 | 45 | 52 |
| 600 | 7.7 | 2.0 | 1.4 | 1.4 | 1.5 |
| 1,200 | 6.9 | 3.7 | 2.6 | 3.0 | 3.4 |
| 1,800 | 8.1 | 6.0 | 5.2 | 5.4 | 4.9 |

TABLE 6B

EFFECT OF TEOS CONCENTRATION WITHOUT CO-CURED LUBRICIOUS REACTANT ON ABRASION RESISTANCE

| | Percent Haze Weight Percent TEOS | | | | |
|---|---|---|---|---|---|
| Number of Cycles | 0 | 21 | 35 | 45 | 52 |
| 600 | 6.5 | 7.0 | 5.8 | 7.1 | 6.0 |
| 1,200 | 12.6 | 11.6 | 8.8 | 11.6 | 8.9 |
| 1,800 | 17.7 | 13.7 | 12.4 | 17.1 | 9.3 |

Example 7

The concentration of the lubricious reactant (Fomblin Z-DIAC®) in the fluid as applied affects the enhancement of the coating. Too high a concentration is actually detrimental to the coating performance, and too little does not provide sufficient reactive lubricant into the basecoat. A series of Fomblin Z-DIAC® solutions in Fomblin PFS-1™ solvent were prepared ranging from 0 percent to 2 percent. Polycarbonate test specimens were first coated with a basecoat solution as described for Coating Fluid 3 in Example 3, then were coated in each of the lubricious reactant solutions. After air drying, the test specimens were cured for 1 hour at 130° C. Abrasion resistance was tested at 600 and 1,800 cycles. As shown in Table 7, a Fomblin Z-DIAC® concentration of 0.25 to 0.5 percent by weight provided the highest level of enhancement.

TABLE 7

EFFECT OF FOMBLIN Z-DIAC® CONCENTRATION IN BASECOAT ON ABRASION RESISTANCE

| | Percent Haze Weight Percent Fomblin Z-DIAC® | | | | | |
|---|---|---|---|---|---|---|
| Number of Cycles | 0 | 0.17 | 0.25 | 0.50 | 1.0 | 2.0 |
| 600 | 10.2 | 4.4 | 2.5 | 2.7 | 7.7 | 13.8 |
| 1,800 | 23.6 | 18.9 | 10.8 | 11.1 | 15.4 | 18.9 |

Example 8

A coating solution was prepared as described for Coating Fluid 3 in Example 3. Polyethyleneterephthalate (PET) test specimens were coated with the coating solution and allowed to dry at ambient temperature for 30 minutes. One set of specimens was coated with a solution containing 0.5 percent by weight of Fomblin Z-DIAC® in Fomblin Perfluorosolv PFS-1™ solvent, and then the solvent was allowed to evaporate. A second set of test specimens was left uncoated. A third set of test specimens was also uncoated and used as a control (uncoated and unabraded). The coating on the first set of test specimens was then cured in a 800-watt Tappan microwave oven for 6 minutes. Following curing, the test specimens were allowed to condition at room temperature for one hour. The first and second sets of test specimens were then tested for abrasion resistance.

The abrasion results are presented in Table 8. These data demonstrate that the gradient coating may be co-cured using microwave energy, and that the gradient coating adheres to a PET substrate.

TABLE 8

EFFECT OF CURING LUBRICIOUS REACTANT WITH MICROWAVE ENERGY ON PET SUBSTRATE

| | | | | Percent Haze | | |
|---|---|---|---|---|---|---|
| Molar Ratio | | | | | | Unabraded |
| | A | B | C | Coated | Uncoated | Control |
| Fluid 3 (see Example 3) | 4 | 2 | 1 | 3.8 | 64.8 | 3.0 |

A = APTEOS
B = TEOS
C = Diepoxide

Example 9

A coating solution was prepared as described for Coating Fluid 3 in Example 3. Polypropylene test specimens were coated in the coating solution and allowed to dry at ambient temperature for 30 minutes. One set of specimens was coated with a solution containing 0.5 percent by weight of Fomblin Z-DIAC® in Fomblin Perfluorosolv PFS-1™ solvent, and then the solvent was allowed to evaporate. A second set of test specimens was left uncoated. A third set of test specimens was also uncoated and used as a control (uncoated and unabraded). The coatings on the first set of test specimens were then cured in a 800-watt Tappan microwave oven for 5 minutes. Following curing, the test specimens were allowed to condition at room temperature for one hour. The first and second sets of test specimens were then tested for abrasion resistance.

The abrasion results are presented in Table 9. These data demonstrate that the gradient coating may be co-cured using microwave energy, and that the gradient coating adheres to a polypropylene substrate.

TABLE 9

EFFECT OF CURING LUBRICIOUS REACTANT WITH MICROWAVE ENERGY ON POLYPROPYLENE SUBSTRATE

| | | | | Percent Haze | | |
|---|---|---|---|---|---|---|
| Molar Ratio | | | | | | Unabraded |
| | A | B | C | Coated | Uncoated | Control |
| Fluid 3 (see Example 3) | 4 | 2 | 1 | 7.8 | 73.8 | 4.4 |

A = APTEOS
B = TEOS
C = Diepoxide

Example 10

A coating solution was prepared as described for Coating Fluid 3 in Example 3. Two sets of test specimens of CR-39 material (diethyleneglycol bis allylcarbonate) were coated with the coating solution and allowed to dry at ambient temperature for 30 minutes. One set of these test specimens was then coated with a solution containing 0.5 percent by weight of Fomblin Z-DIAC® in Fomblin Perfluorosolv PFS-1™ solvent, and then the solvent was allowed to evaporate. A third set of test specimens was uncoated for comparison purposes. The coatings on the first two sets of test specimens were then cured for 1 hour at 130° C. All three sets of test specimens were then tested for abrasion resistance.

The abrasion results are presented in Table 10. These data demonstrate the enhancement of the co-cured gradient coating over the basecoat alone, and that the gradient coating adheres to a CR-39 substrate. The basecoat alone adds no value to the abrasion resistance of the CR-39 substrate.

TABLE 10

EFFECT OF LUBRICIOUS REACTANT ON CR-39 SUBSTRATE

| | | | | Percent Haze | | |
|---|---|---|---|---|---|---|
| | Molar Ratio | | | Basecoat and Lubricious Reactant | Basecoat Only | Uncoated |
| | A | B | C | | | |
| Fluid 3 (see Example 3) | 4 | 2 | 1 | 4.0 | 20.8 | 21.0 |

A = APTEOS
B = TEOS
C = Diepoxide

Comparative Example 1

For the purpose of demonstrating novelty and non-obviousness of the present invention, two commercially available hardcoat products were used. The first was Lexan® MR10, a pre-hardcoated polycarbonate available from GE Polymer Shapes, Huntersville, N.C. The second was a hardcoat solution, PHC587 Silicone Resin Solution from GE Silicones (Wilton, Conn.). For the PHC587, uncoated polycarbonate test specimens were first cleaned with isopropanol. The PHC587 coating and curing procedure followed the manufacturer's instructions. Each coated polycarbonate test specimen was tested for abrasion resistance, and the results are shown in Tables 11 and 12.

A comparative second set of samples was prepared as described above. Each sample was dip coated in a solution containing 0.5 percent Fomblin Z-DIAC® in Fomblin PFS-1™ solvent. After air drying, the coated test specimens were cured for 1 hour at 130° C., then tested for abrasion resistance. These results are also shown in Tables 11 and 12.

As shown in Tables 11 and 12, the abrasion resistance of Lexan® MR-10 and the PHC587 coated test specimens were essentially the same. The data also show that the lubricious reactant provided no enhancement of the abrasion resistance. The lubricious reactant in this example was essentially removed before the end of the first abrasion tests.

TABLE 11

SCRATCH RESISTANCE OF POLYCARBONATE COATED WITH MR10 AND FOMBLIN Z-DIAC®

| | Percent Haze | |
|---|---|---|
| Number of Cycles | MR10 | MR10 with Fomblin Z-DIAC® |
| 600 | 19.5 | 16.1 |
| 1,200 | 26.4 | 27.7 |
| 1,800 | 34.6 | 34.5 |

TABLE 12

SCRATCH RESISTANCE OF POLYCARBONATE COATED WITH PHC587 AND FOMBLIN Z-DIAC ®

| | Percent Haze | |
|---|---|---|
| Number of Cycles | PHC587 | PHC587 with Fomblin Z-DIAC ® |
| 600 | 19.3 | 17.3 |
| 1,200 | 26.0 | 23.0 |
| 1,800 | 31.0 | 32.0 |

Comparative Example 2

Polycarbonate test specimens was prepared and coated with PHC587 as described in Comparative Example 1 and allowed to air dry for 1 hour. The test specimens were then divided into two sets. For the first set, the air-dried test specimens were coated in a solution containing 0.5 percent Fomblin Z-DIAC® in Fomblin PFS-1™ solvent. The coated test specimens were cured for 1 hour at 130° C., then tested for abrasion resistance. For the second set of test specimens, the air-dried test specimens were cured for 1 hour at 130° C. prior to coating with the Fomblin Z-DIAC® solution. After coating with the Fomblin Z-DIAC® solution, these test specimens were again cured for 1 hour at 130° C. The test results are presented in Table 13. These data show that coatings based on the chemistry of PHC587 are not capable of co-curing with the lubricious reactant, further adding to the non-obviousness of the present invention.

TABLE 13

SCRATCH RESISTANCE OF POLYCARBONATE COATED WITH PHC587 AND FOMBLIN Z-DIAC ®

| | Percent Haze | |
|---|---|---|
| Number of Cycles | PHC587 Uncured Before Coating with Fomblin Z-DIAC ® | PHC587 Cured Before Coating with Fomblin Z-DIAC ® |
| 600 | 16.3 | 17.3 |
| 1,200 | 22.0 | 23.0 |
| 1,800 | 31.0 | 32.0 |

We claim:

1. A composition for a gradient coating comprising:
  a) a first alkoxysilane monomer having at least one siloxane linkage-forming group and at least one non-siloxane-linkage-forming group having at least one reactive side group capable of reacting with the lubricious reactant, the siloxane linkage-forming group and the non-siloxane-linkage-forming group being attached to a silicon atom, and at least one selected from the group consisting of:
    i. a second alkoxysilane monomer; and
    ii. a third alkoxysilane monomer;
    and combinations and mixtures thereof;
  b) a non-silane-based epoxy resin; and
  c) a lubricious reactant;
  and combinations and mixtures thereof.

2. The composition according to claim 1 wherein the second alkoxysilane monomer has at least one siloxane linkage-forming group and at least one non-siloxane-linkage-forming reactive group attached to a silicon atom, wherein the non-siloxane-linkage-forming reactive group is capable of reacting with the reactive side group of the first alkoxysilane monomer.

3. The composition according to claim 1 wherein the third alkoxysilane monomer has at least three siloxane linkage-forming groups attached to a silicon atom.

4. The composition according to claim 1 wherein the non-silane-based epoxy resin is capable of reacting with the reactive side group of the first alkoxysilane monomer, the reactive non-siloxane-linkage-forming group of the second alkoxysilane monomer, or combinations thereof.

5. The composition according to claim 1 wherein the lubricious reactant is a functional perfluoropolyether represented by the general formula (I),

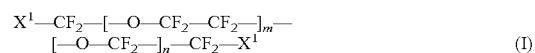

(I)

wherein $X^1$ comprises a carboxylic acid group, a hydroxyl group, or an ester, and m and n vary such that the molecular weight has a value in the range between about 200 and 10,000.

6. The composition according to claim 1 wherein the lubricious reactant is a silicone compound represented by the general formula (II),

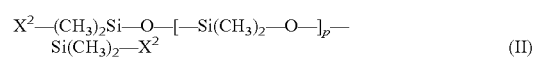

(II)

wherein $X^2$ comprises a carboxylic acid group, a hydroxyl group, or an ester, and p varies such that the molecular weight has a value in the range between about 500 and about 200,000.

7. The composition according to claim 1 wherein each siloxane linkage-forming group of the first alkoxysilane monomer is an independently selected alkoxy group represented by the general formula $-OR^1$, wherein each $R^1$ group is an independently selected C1 to C6 alkyl group, and the non-siloxane-linkage-forming group of the first alkoxysilane monomer is a nonhydrolyzable reactive group represented by the general formula $R^2-[CH_2]_q-$, wherein q has a value in the range between about 1 and about 6 and $R^2$ is a primary amine or secondary amine comprising an independently selected C1 to C6 alkyl group or an aryl group.

8. The composition according to claim 2 wherein each siloxane linkage-forming group of the second alkoxysilane monomer is an independently selected alkoxy group represented by the general formula $-OR^3$, wherein each $R^3$ group is an independently selected C1 to C6 alkyl group, and each non-siloxane-linkage-forming reactive group of the second alkoxysilane monomer is an independently selected epoxide.

9. The composition according to claim 3 wherein each siloxane linkage-forming group of the third alkoxysilane monomer is an independently selected alkoxy group represented by the general formula $-OR^4$, wherein each $R^4$ group is an independently selected C1 to C6 alkyl group.

10. The composition according to claim 4 wherein the non-silane-based epoxy resin has at least two or more epoxide-functional groups per molecule.

11. The composition according to claim 1 wherein the first alkoxysilane monomer is selected from the group consisting of 3-aminopropyltriethoxysilane, 3-aminopropyltrimethoxysilane, 2-aminopropyltriethoxysilane, aminomethyltriethoxysilane, 2-aminoethyltriethoxysilane, N,N-dimethylaminopropyltrimethoxysilane, N-(2-aminoethyl)- aminoethyltriethoxysilane, and N-methylaminopropyltriethoxysilane and combinations and mixtures thereof.

12. The composition according to claim 1 wherein the first alkoxysilane monomer is 3-aminopropyltriethoxysilane.

13. The composition according to claim 1 wherein the second alkoxysilane monomer is selected from the group consisting of 3-glycidoxypropyltriethoxysilane, 3-glycidoxypropyltrimethoxysilane, (3,4-epoxycyclohexyl)-methyltrimethoxysilane, 2-epoxypropyltriethoxysilane, and 2-epoxypropyltrimethoxysilane and combinations and mixtures thereof.

14. The composition according to claim 1 wherein the second alkoxysilane monomer is 3-glycidoxypropyltriethoxysilane.

15. The composition according to claim 1 wherein the third alkoxysilane monomer is selected from the group consisting of tetramethoxysilane, tetraethoxysilane, tetrapropoxysilane, methyltrimethoxysilane, methyltriethoxysilane, ethyltrimethoxysilane, ethyltriethoxysilane, propyltrimethoxysilane, and propyltriethoxysilane and combinations and mixtures thereof.

16. The composition according to claim 1 wherein the third alkoxysilane monomer is tetraethoxysilane.

17. The composition according to claim 1 wherein the non-silane-based epoxy resin is selected from the group consisting of 1,4-cyclohexanedimethanol diglycidylether, 1,2-cyclohexanedimethanol diglycidylether, 1,4-butanediol diglycidylether, trimethylolpropane triglycidylether, diethyleneglycol diglycidylether, diglycidylether of bis-phenol A, diglycidylether of bis-phenol F, and epoxy novolac resins and combinations and mixtures thereof.

18. The composition according to claim 1 wherein the non-silane-based epoxy resin is 1,4-cyclohexanedimethanol diglycidylether.

19. An article having at least one surface coated with a gradient coating composition, the gradient coating composition comprising:
a) a first alkoxysilane monomer, and
i. a second alkoxysilane monomer having at least one siloxane linkage-forming group and at least one non-siloxane-linkage-forming reactive group attached to a silicon atom, wherein the non-siloxane-linkage-forming reactive group is capable of reacting with the reactive side group of the first alkoxysilane monomer; and optionally
ii. a third alkoxysilane monomer;
and combinations and mixtures thereof;
b) a non-silane-based epoxy resin; and
c) a lubricious reactant;
and combinations and mixtures thereof.

20. An article having at least one surface coated with a gradient coating composition, the gradient coating composition comprising:
a) a first alkoxysilane monomer having at least one siloxane linkage-forming group and at least one non-siloxane-linkage-forming group, the siloxane linkage forming group and the non-siloxane-linkage-forming group being attached to a silicon atom, and at least one selected from the group consisting of:
i. a second alkoxysilane monomer having at least one siloxane linkage-forming group and at least one non-siloxane-linkage-forming reactive group attached to a silicon atom, wherein the non-siloxane-linkage-forming reactive group is capable of reacting with the reactive side group of the first alkoxysilane monomer; and a third alkoxysilane monomer having at least three siloxane linkage-forming groups attached to a silicon atom;
and combinations and mixtures thereof;
b) a non-silane-based epoxy resin capable of reacting with the reactive side group of the first alkoxysilane monomer, the reactive non-siloxane-linkage-forming group of the second alkoxysilane monomer;
c) at least one lubricous reactant selected from the group consisting of:
i. a functional perfluoropolyether represented by the general formula (I),

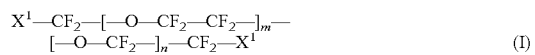
(I)

wherein $X^1$ comprises a carboxylic acid group, a hydroxyl group, or an ester, and m and n vary such that the molecular weight has a value in the range between about 200 and about 10,000; and
ii. a silicone compound represented by the general formula (II),

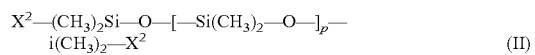
(II)

wherein $X^2$ comprises a carboxylic acid group, a hydroxyl group, or an ester, and p varies such that the molecular weight has a value in the range between about 500 and about 200,000;
and combinations and mixtures thereof.

21. The article according to claim 20 wherein each siloxane linkage-forming group of the first alkoxysilane monomer is an independently selected alkoxy group represented by the general formula $-OR^5$, wherein each $R^5$ group is an independently selected C1 to C6 alkyl group, and the non-siloxane-linkage-forming group of the first alkoxysilane monomer is a nonhydrolyzable reactive group capable of reacting with the lubricious reactant represented by the general formula $R^6-[CH_2]_q-$, wherein q has a value in the range between about 1 and about 6 and $R^6$ is a primary amine or secondary amine comprising an independently selected C1 to C6 alkyl group or an aryl group.

22. The article according to claim 20 wherein each siloxane linkage-forming group of the second alkoxysilane monomer is an independently selected alkoxy group represented by the general formula $-OR^7$, wherein each $R^7$ group is an independently selected C1 to C6 alkyl group, and each non-siloxane-linkage-forming reactive group of the second alkoxysilane monomer is an independently selected epoxide.

23. The article according to claim 20 wherein each siloxane linkage-forming group of the third alkoxysilane monomer is an independently selected alkoxy group represented by the general formula $-OR^8$, wherein each $R^8$ group is an independently selected C1 to C6 alkyl group.

24. The article according to claim 20 wherein the non-silane-based epoxy resin has at least two or more epoxide-functional groups per molecule.

25. An article having at least one surface coated with a gradient coating composition, the gradient coating composition comprising:
a) a first alkoxysilane monomer selected from the group consisting of 3-aminopropyltriethoxysilane, 3-aminopropyltrimethoxysilane, 2-aminopropyltriethoxysilane, aminomethyltriethoxysilane, 2-aminoethyltriethoxysilane, N,N-dimethylaminopropyltrimethoxysilane, N-(2-aminoethyl)-aminoethyltriethoxysilane, and N-methylaminopropyltriethoxysilane and combinations and mixtures thereof, and at least one selected from the group consisting of:
  i. a second alkoxysilane monomer selected from the group consisting of 3-glycidoxypropyltriethoxysilane, 3-glycidoxypropyltrimethoxysilane, (3,4-epoxyclyclohexyl)-methyltrimethoxysilane, 2-epoxypropyltriethoxysilane, and 2-epoxypropyltrimethoxysilane and combinations and mixtures thereof; and
  ii. a third alkoxysilane monomer selected from the group consisting of tetramethoxysilane, tetraethoxysilane, tetrapropoxysilane, methyltrimethoxysilane, methyltriethoxysilane, ethyltrimethoxysilane, ethyltriethoxysilane, propyltrimethoxysilane, and propyltriethoxysilane and combinations and mixtures thereof; and
  and combinations and mixtures thereof;
b) a non-silane-based epoxy resin selected from the group consisting of 1,4-cyclohexanedimethanol diglycidylether, 1,2-cyclohexanedimethanol diglycidylether, 1,4-butanediol diglycidylether, trimethylolpropane triglycineglycol diglycidylether, diethyleneglycol diglycidylether, diglycidylether of bis-phenol A, diglycidylether of bis-phenol F, and epoxy novolac resins and combinations and mixtures thereof;
  and combinations and mixtures thereof; and
c) at least one lubricious reactant selected from the group consisting of:
  i. a functional perfluoropolyether represented by the general formula (I),

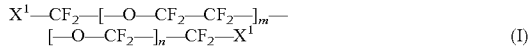   (I)

wherein $X^1$ is a carboxylic acid group, a hydroxyl group, or an ester, and m and n vary such that the molecular weight has a value in the range between about 200 and about 10,000; and
  ii. a silicone compound represented by the general formula (II),

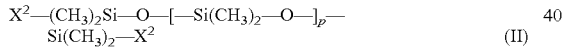   (II)

wherein $X^2$ is a carboxylic acid group, a hydroxyl group, or an ester, and p varies such that the molecular weight has a value in the range between about 500 and about 200,000;
  and combinations and mixtures thereof.

26. An article having at least one surface coated with a gradient coating composition, the gradient coating composition comprising:
  a) 3-aminopropyltriethoxysilane;
  b) at least one selected from the group consisting of 3-glycidoxypropyltriethoxysilane and tetraethoxysilane and combinations and mixtures thereof;
  c) 1,4-cyclohexanedimethanol diglycidylether; and
  d) at least one lubricious reactant selected from the group consisting of:
    i. a functional perfluoropolyether represented by the general formula (I),

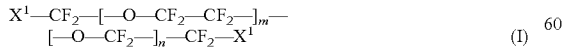   (I)

wherein $X^1$ is a carboxylic acid group, a hydroxyl group, or an ester, and m and n vary such that the molecular weight has a value in the range between about 200 and about 10,000; and
    ii. a silicone compound represented by the general formula (II),

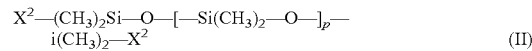   (II)

wherein $X^2$ is a carboxylic acid group, a hydroxyl group, or an ester, and p varies such that the molecular weight has a value in the range between about 500 and about 200,000;
    and combinations and mixtures thereof.

27. A method for coating with a gradient coating composition at least one surface of an article, the method comprising:
  a) applying a basecoat comprising a first alkoxysilane monomer, a non-silane-based epoxy resin, and at least one selected from the group consisting of:
    i. a second alkoxysilane monomer; and
    ii. a third alkoxysilane monomer;
    and combinations and mixtures thereof;
  b) drying the basecoat;
  c) applying at least one lubricious reactant to the dried basecoat;
  d) allowing the lubricious reactant to permeate the basecoat; and
  e) exposing the coated article to an energy source to co-cure the basecoat and lubricious reactant.

28. The method according to claim 27 wherein the energy source is at least one selected from the group consisting of thermal, microwave, ionizing radiation, and ionizing gas plasma and combinations thereof.

29. A method for coating with a gradient coating at least one surface of an article, the method comprising:
  a) applying a basecoat comprising a first alkoxysilane monomer having at least one siloxane linkage-forming group and at least one non-siloxane-linkage-forming group, the siloxane linkage forming group and the non-siloxane-linkage-forming group being attached to a silicon atom, at least one selected from the group consisting of:
    i. a second alkoxysilane monomer having at least one siloxane linkage-forming group and at least one non-siloxane-linkage-forming reactive group attached to a silicon atom, wherein the non-siloxane-linkage-forming reactive group is capable of reacting with the reactive side group of the first alkoxysilane monomer; and
    ii. a third alkoxysilane monomer having at least three siloxane linkage-forming groups attached to a silicon atom; and
    a non-silane-based epoxy resin capable of reacting with the reactive side group of the first alkoxysilane monomer, the reactive non-siloxane-linkage-forming group of the second alkoxysilane monomer;
    and combinations and mixtures thereof;
  b) drying the basecoat;
  c) applying to the dried basecoat at least one lubricious reactant selected from the group consisting of:
    i. a functional perfluoropolyether represented by the general formula (I),

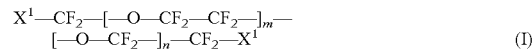   (I)

wherein $X^1$ is a carboxylic acid group, a hydroxyl group, or an ester, and m and n vary such that the molecular weight has a value in the range between about 200 and about 10,000; and
    ii. a silicone compound represented by the general formula (II),

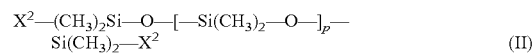   (II)

wherein $X^2$ is a carboxylic acid group, a hydroxyl group, or an ester, and p varies such that the molecular weight has a value in the range between about 500 and about 200,000;

and combinations and mixtures thereof;

d) allowing the lubricious reactant to permeate the basecoat; and e) exposing the coated article to an energy source to co-cure the basecoat and the lubricious reactant.

30. The method according to claim 29 wherein each siloxane linkage-forming group of the first alkoxysilane monomer is an independently selected alkoxy group represented by the general formula —$OR^9$, wherein each $R^9$ group is an independently selected C1 to C6 alkyl group, and the non-siloxane-linkage-forming group of the first alkoxysilane monomer is a nonhydrolyzable reactive group capable of reacting with the lubricious reactant represented by the general formula $R^{10}$—$[CH_2]_q$—, wherein q has a value in the range between about 1 and about 6 and $R^{10}$ is a primary amine or secondary amine comprising an independently selected C1 to C6 alkyl group or an aryl group.

31. The method according to claim 29 wherein each siloxane linkage-forming group of the second alkoxysilane monomer is an independently selected alkoxy group represented by the general formula —$OR^{11}$, wherein each $R^{11}$ group is an independently selected C1 to C6 alkyl group, and each non-siloxane-linkage-forming reactive group of the second alkoxysilane monomer is an independently selected epoxide.

32. The method according to claim 29 wherein each siloxane linkage-forming group of the third alkoxysilane monomer is an independently selected alkoxy group represented by the general formula —$OR^{12}$, wherein each $R^{12}$ group is an independently selected C1 to C6 alkyl group.

33. The method according to claim 29 wherein the non-silane-based epoxy resin has at least two or more epoxide-functional groups per molecule.

34. The method of claim 29 wherein the energy source is at least one selected from the group consisting of thermal, microwave, ionizing radiation, and ionizing gas plasma and combinations thereof.

35. A method for coating with a gradient coating composition at least one surface of an article, the method comprising:

a) applying a basecoat comprising a first alkoxysilane monomer selected from the group consisting of 3-aminopropyltriethoxysilane, 3-aminopropyltrimethoxysilane, 2-aminopropyltriethoxysilane, aminomethyltriethoxysilane, 2-aminoethyltriethoxysilane, N,N-dimethylaminopropyltrimethoxysilane, N-(2-aminoethyl)-aminoethyltriethoxysilane, and N-methylaminopropyltriethoxysilane and combinations and mixtures thereof, at least one selected from the group consisting of:
  i. a second alkoxysilane monomer selected from the group consisting of 3-glycidoxypropyltriethoxysilane, 3-glycidoxypropyltrimethoxysilane, (3,4-epoxycyclohexyl)-methyltrimethoxysilane, 2-epoxypropyltriethoxysilane, and 2-epoxypropyltrimethoxysilane and combinations and mixtures thereof; and
  ii. a third alkoxysilane monomer selected from the group consisting of tetramethoxysilane, tetraethoxysilane, tetrapropoxysilane, methyltrimethoxysilane, methyltriethoxysilane, ethyltrimethoxysilane, ethyltriethoxysilane, propyltrimethoxysilane, and propyltriethoxysilane and combinations and mixtures thereof; and a non-silane-based epoxy resin selected from the group consisting of 1,4-cyclohexanedimethanol diglycidylether, 1,2-cyclohexanedimethanol diglycidylether, 1,4-butanediol diglycidylether, trimethylolpropane triglycidylether, diethyleneglycol diglycidylether, diglycidylether of bis-phenol A, diglycidylether of bis-phenol F, and epoxy novolac resins and combinations and mixtures thereof;

and combinations and mixtures thereof;

b) drying the basecoat;

c) applying at least one lubricious reactant selected from the group consisting of:
  i. a functional perfluoropolyether represented by the general formula (I),

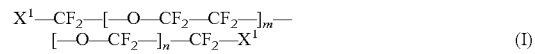

(I)

wherein $X^1$ is a carboxylic acid group, a hydroxyl group, or an ester, and m and n vary such that the molecular weight has a value in the range between about 500 and about 10,000; and ii. a silicone compound represented by the general formula (II),

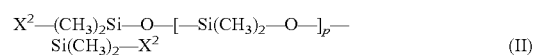

(II)

wherein $X^2$ is a carboxylic acid group, a hydroxyl group, or an ester, and p varies such that the molecular weight has a value in the range between about 500 and about 200,000;

and combinations and mixtures thereof;

d) allowing the lubricious reactant to permeate the basecoat; and e) exposing the coated article to an energy source to co-cure the basecoat and lubricious reactant.

36. The method according to claim 35 wherein the energy source is at least one selected from the group consisting of thermal, microwave, ionizing radiation, and ionizing gas plasma and combinations thereof.

37. A method for coating with a gradient coating at least one surface of an article, the method comprising:

a) applying a basecoat comprising 3-aminopropyltriethoxysilane, 1,4-cyclohexanedimethanol diglycidylether and at least one selected from the group consisting of 3-glycidoxypropyltriethoxysilane and tetraethoxysilane, and combinations and mixtures thereof;

b) drying the basecoat;

c) applying at least one lubricious reactant selected from the group consisting of:
  i. a functional perfluoropolyether represented by the general formula (I),

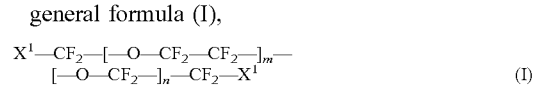

(I)

wherein $X^1$ is a carboxylic acid group, a hydroxyl group, or an ester, and m and n vary such that the molecular weight has a value in the range between about 200 and about 10,000; and ii. a silicone compound represented by the general formula (II),

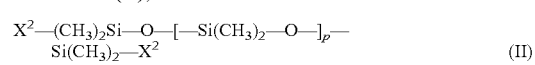

(II)

wherein $X^2$ is a carboxylic acid group, a hydroxyl group, or an ester, and p varies such that the molecular weight has a value in the range between about 500 and about 200,000;
and combinations and mixtures thereof;
d) allowing the lubricious reactant to permeate the basecoat; and
e) exposing the coated article to an energy source to co-cure the basecoat and lubricious reactant.

38. The method according to claim 37 wherein the energy source is at least one selected from the group consisting of thermal, microwave, ionizing radiation, and ionizing gas plasma and combinations thereof.

* * * * *